United States Patent
Taura et al.

(10) Patent No.: US 6,434,205 B1
(45) Date of Patent: Aug. 13, 2002

(54) DIGITAL BROADCAST RECEIVER USING WEIGHTED SUM OF CHANNEL IMPULSE RESPONSE DATA TO ADJUST SAMPLING WINDOW

(75) Inventors: Kenichi Taura; Tadatoshi Ohkubo; Masayuki Ishida, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/286,668

(22) Filed: Apr. 6, 1999

(30) Foreign Application Priority Data

Jun. 2, 1998 (JP) .......................................... 10-153045

(51) Int. Cl.$^7$ ................................................ H04L 7/00
(52) U.S. Cl. ...................... 375/355; 375/316; 375/344; 375/354; 375/371
(58) Field of Search ................................ 375/355, 354, 375/316, 340, 371, 344; 370/208, 350, 203, 210

(56) References Cited

U.S. PATENT DOCUMENTS

| | | | |
|---|---|---|---|
| 5,191,576 A | 3/1993 | Pommier et al. | 370/312 |
| 5,790,784 A | * 8/1998 | Beale et al. | 370/520 |
| 5,818,813 A | * 10/1998 | Saito et al. | 370/208 |
| 5,991,289 A | * 11/1999 | Huang et al. | 370/350 |
| 6,038,275 A | * 3/2000 | Taura et al. | 375/371 |

FOREIGN PATENT DOCUMENTS

| | | |
|---|---|---|
| EP | 0837582 A2 | 10/1997 |
| EP | 0841787 A2 | 10/1997 |
| EP | 0836304 A2 | 4/1998 |
| WO | WO97/07620 | 2/1997 |

* cited by examiner

Primary Examiner—Stephen Chin
Assistant Examiner—Shuwang Liu

(57) ABSTRACT

A digital broadcast receiver receiving a multi-carrier signal controls the timing of a sampling window, used in demodulation of the multi-carrier signal, according to a channel impulse response waveform obtained by processing of a synchronization signal occurring in the multi-carrier signal. The values in the channel impulse response waveform are multiplied by corresponding weighting coefficients, the resulting products are added to obtain a weighted sum, and the timing of the sampling window is adjusted according the weighted sum. Under a wide variety of reception conditions, this control scheme avoids inter-symbol interference, and leaves adequate timing margins to accommodate new signal components that may appear.

10 Claims, 8 Drawing Sheets

FIG.10

| DAB MODE | INITIAL VALUE | LENGTH / ΔK | LENGTH / ΔK | LENGTH / ΔK | LENGTH / ΔK | LENGTH / ΔK | TOTAL LENGTH / FINAL K |
|---|---|---|---|---|---|---|---|
| 1 | -32768 | 448/24 | 96/173 | 448/24 | 96/173 | 448/24 | 1536/32704 |
| 2 | 〃 | 112/96 | 24/692 | 112/96 | 24/692 | 112/96 | 384/32704 |
| 3 | 〃 | 56/192 | 12/1384 | 56/192 | 12/1384 | 56/192 | 192/32704 |
| 4 | 〃 | 224/48 | 48/346 | 224/48 | 48/346 | 224/48 | 768/32704 |

DIGITAL BROADCAST RECEIVER USING WEIGHTED SUM OF CHANNEL IMPULSE RESPONSE DATA TO ADJUST SAMPLING WINDOW

BACKGROUND OF THE INVENTION

The present invention relates to a receiver receiving a multi-carrier digital broadcast signal such as an orthogonal frequency division multiplexed (OFDM) signal, more particularly to the method of symbol synchronization employed in the receiver.

OFDM broadcasting enables digital data to be transmitted to mobile receivers despite such problems as multipath reception and fading. OFDM systems are already being deployed, a prominent example being the digital audio broadcast (DAB) system standardized in Recommendation BS.774 of the Radiotelecommunication Sector of the International Telecommunications Union (ITU-R), entitled "Service requirements for digital sound broadcasting to vehicular, portable, and fixed receivers using terrestrial transmitters in the VHF/UHF bands."

A DAB signal is divided into frames, each comprising a pair of synchronization signals followed by a number of data symbols with respective guard intervals. The first synchronization signal is a null symbol with zero amplitude. The second synchronization signal is a phase reference symbol in which known data are transmitted.

A DAB receiver carries out frame synchronization and approximate symbol synchronization by using an envelope detector to detect the null symbol. A conventional DAB receiver refines symbol synchronization by canceling the known data from the demodulated phase reference symbol, converting the results to the time domain to obtain a channel impulse response waveform, and detecting peak values in the channel impulse response waveform. When multiple peaks are present, the conventional receiver selects one of the peak values and synchronizes symbol demodulation according to the selected peak.

Reception conditions can change rapidly, especially in a mobile environment. New signal components may appear abruptly, as when a mobile receiver emerges from an area shielded by tall buildings or topographic obstructions and starts receiving a strong signal from a nearby transmitter. It is therefore advisable for the conventional receiver to leave a timing margin to allow for the sudden appearance of new peaks in the channel impulse response waveform. A conventional receiver that does not allow such a timing margin will experience frequent inter-symbol interference, with adverse effects on receiver performance.

The provision of a timing margin, however, has the effect of narrowing the guard interval around each symbol. The narrowed guard interval may be unable to accommodate large delays between different signal components, again leading to inter-symbol interference. When the large delays are due to persistent conditions, such as the arrival of signals from different transmitters in a single-frequency network, the performance degradation is persistent.

The conventional digital broadcast receiver also controls the sampling frequency on the basis of the selected peak in the channel impulse response waveform. This leads to the problem of unstable frequency control under multipath reception conditions, when the selection shifts frequently from one peak to another.

Further details will be given in the detailed description of the invention.

SUMMARY OF THE INVENTION

An object of the present invention is to provide a digital broadcast receiver that extracts appropriate timing control information from a channel impulse response waveform under adverse reception conditions, including multipath reception and the large delays encountered in single-frequency networks.

The invented digital broadcast receiver receives a multi-carrier signal that periodically includes a synchronization signal. The receiver has a data demodulator that demodulates the multi-carrier signal by use of a sampling window to obtain demodulated data, and a control unit that controls the timing of the sampling window. The control unit comprises a waveform generator that generates a channel impulse response waveform from the demodulated data of the synchronization signal, and a multiply-add unit. The multiply-add unit multiplies values in the channel impulse response waveform by corresponding weighting coefficients in a predetermined weighting function, thereby obtaining product values, and adds the product values to obtain a weighted sum. The control unit adjusts the timing of the sampling window according to the weighted sum.

The control unit also adjusts the frequency of a voltage-controlled oscillator that determines the sampling rate of an analog-to-digital converter supplying sample values to the data demodulator. In one aspect of the invention, the control unit performs this adjustment according to the difference between the timing of a maximum peak value in the channel impulse response waveform and an adjusted peak timing. The adjusted peak timing is the timing of the maximum peak value in the channel impulse response waveform obtained from a preceding synchronization signal, adjusted to compensate for the amount by which the sampling window timing was adjusted when the preceding synchronization signal was processed.

By controlling the sampling window timing according to a weighted sum of all values in the channel impulse response waveform, the invented digital broadcast receiver is able to minimize inter-symbol interference despite the presence of widely separated signal components, while leaving as large a margin as possible to accommodate new signal components.

By controlling the sampling frequency according to the maximum peak timing, the invented digital broadcast receiver avoids unstable frequency control due to the frequent selection of different peaks.

BRIEF DESCRIPTION OF THE DRAWINGS

In the attached drawings:

FIG. 10 shows examples of rules for calculating weighting coefficients.

DETAILED DESCRIPTION OF THE INVENTION

Figure 1:
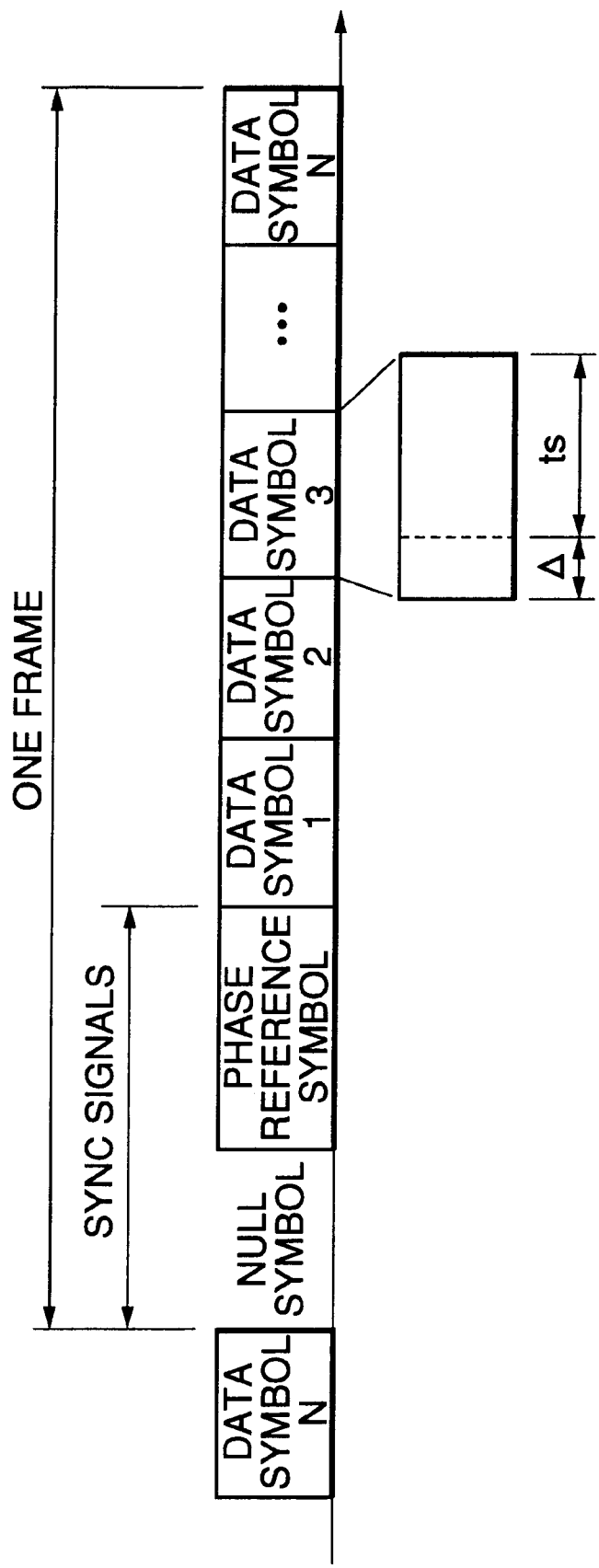
FIG. 1 illustrates the frame structure of a digital audio broadcast signal.

Embodiments of the invention will be described with reference to the attached drawings, in which like parts are indicated by like reference characters. The embodiments are digital audio broadcast (DAB) receivers.

FIG. 1 illustrates the frame structure of the DAB signal. As explained above, each frame comprises a null symbol and a phase reference symbol, which are used as synchronization signals, followed by N data symbols, where N is a positive integer that depends on the DAB transmission mode. Each data symbol comprises a valid symbol interval (ts) preceded by a guard interval (A). The carrier phases in the guard interval are continuous with the phases in the following valid symbol interval.

Each symbol encodes a large number of data values as phase shifts at different carrier frequencies. Each carrier is modulated by differential quaternary phase-shift keying (QPSK). The phase reference symbol provides a starting reference for the phase shifts. The number of carriers and their spacing depend on the DAB transmission mode.

A feature of digital audio broadcasting is that it allows the operation of single-frequency networks (SFNs), in which a plurality of geographically dispersed transmitters broadcast the same signal at the same frequency. In SFN operation, a single receiver may receive identical signals from different transmitters at slightly different times, but transmitter power is controlled so that the delay between any two strongly received signals does not exceed the length of the guard interval. SFN operation provides a way to enlarge a broadcast service area while conserving power and frequency-spectrum resources.

Figure 2:
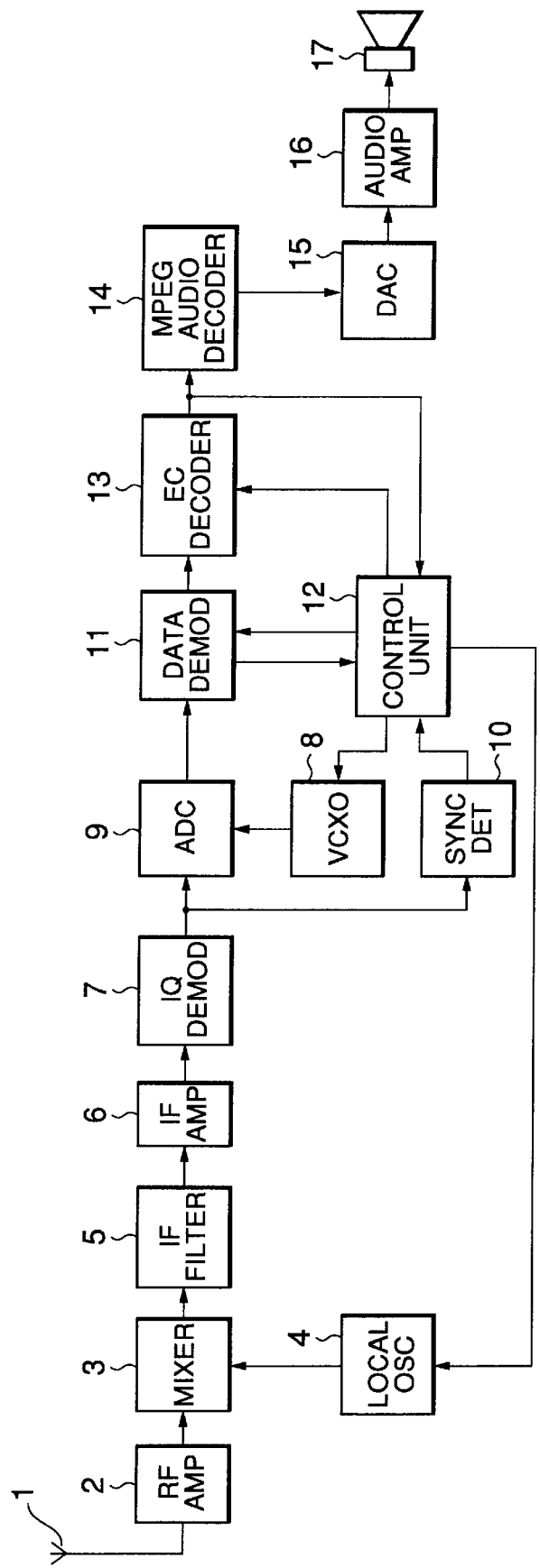
FIG. 2 is a block diagram of a digital audio broadcast receiver in a first embodiment of the invention.

FIG. 2 is a block diagram of a DAB receiver illustrating a first embodiment of the present invention. The receiver comprises an antenna 1, a radio-frequency amplifier (RF AMP) 2, a mixer 3, a local oscillator (OSC) 4, an intermediate-frequency (IF) filter 5, an intermediate-frequency amplifier 6, an orthogonal demodulator (IQ DEMOD) 7, a voltage-controlled crystal oscillator (VCXO) 8, an analog-to-digital converter (ADC) 9, a synchronization signal detector (SYNC DET) 10, a data demodulator 11, a control unit 12, an error-correcting (EC) decoder 13, an MPEG audio decoder 14, a digital-to-analog converter (DAC) 15, an audio amplifier 16, and a loudspeaker 17.

A digital audio broadcast signal received at the antenna 1 is amplified by the radio-frequency amplifier 2, mixed in the mixer 3 with the output of the local oscillator 4, and thereby down-converted to an intermediate-frequency signal. The intermediate-frequency signal is filtered by the intermediate-frequency filter 5 to remove unwanted components such as adjacent-channel interference, then amplified by the intermediate-frequency amplifier 6, and detected in the orthogonal demodulator 7 to generate a complex-valued baseband signal.

The analog-to-digital converter 9 samples the baseband signal at a rate determined by the VCXO 8, and supplies digitized sample values to the data demodulator 11. The data demodulator 11 performs a discrete Fourier transform (DFT) to convert the sampled baseband signal from the time domain to the frequency domain, and compares the phase angles of the frequency-domain data in successive symbols to obtain demodulated data values. These data values are output to the error-correcting decoder 13 in a sequence matching the sequence in which the transmitter modulates data onto the OFDM carriers. The values obtained by the discrete Fourier transform of the phase reference symbol in each frame are supplied to the control unit 12.

The error-correcting decoder 13 performs a de-interleaving process, followed by a convolutional decoding process that corrects transmission channel errors. The decoded data include compressed audio data, which are supplied to the MPEG audio decoder 14, and program-related information describing the content and format of the broadcast, which is supplied to the control unit 12. The MPEG audio decoder 14 expands the audio data according to ISO/MPEG Layer Two procedures. The digital-to-analog converter 15 converts the expanded audio data to an analog audio signal, which is amplified by the audio amplifier 16 and reproduced through the loudspeaker 17.

Incidentally, ISO stands for International Standards Organization, and MPEG for Motion Picture Experts Group.

The synchronization signal detector 10 extracts the envelope of the analog baseband signal to detect the null symbol that marks the beginning of each frame. The control unit 12 uses the timing information provided by the synchronization signal detector 10 to synchronize the operation of the data demodulator 11 and error-correcting decoder 13, so that each symbol is correctly demodulated and decoded. In particular, the control unit 12 sets a sampling window, equal to the length of the valid symbol interval, for the discrete Fourier transform performed by the data demodulator 11. The control unit 12 adjusts the position of the sampling window on the basis of the phase reference symbol data supplied by the data demodulator 11. The control unit 12 also supplies a control signal that controls the frequency of the VCXO 8.

Figure 3:
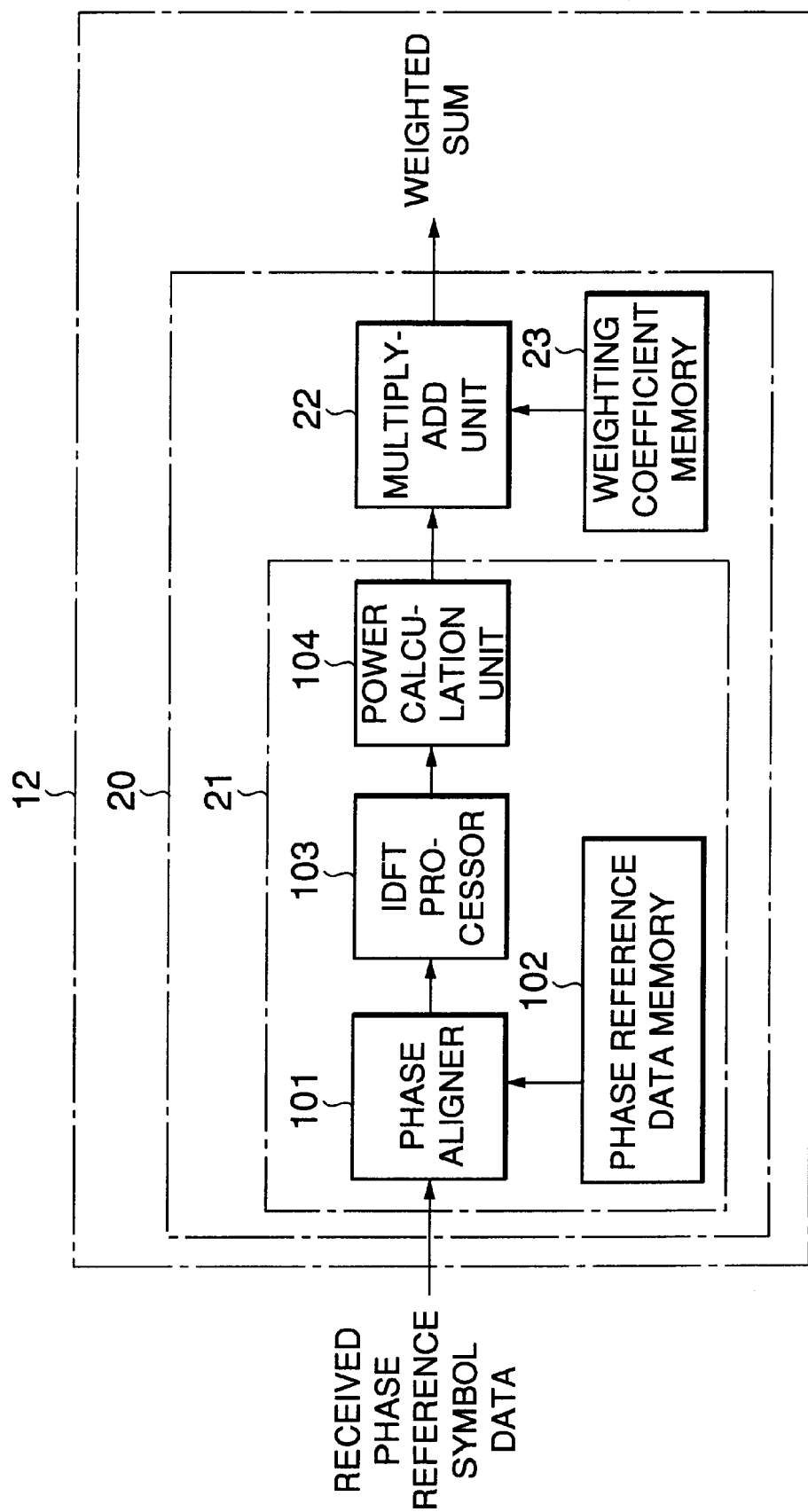
FIG. 3 is a more detailed block diagram of the control unit in FIG. 2.

Referring to FIG. 3, the control unit 12 comprises a timing synchronization processor 20 that processes the received phase reference symbol data to obtain a weighted sum. Other components in the control unit 12 (not visible) use the weighted sum to adjust the symbol synchronization, that is, to adjust the timing of the sampling window for the discrete Fourier transform in data demodulator 11.

The timing synchronization processor 20 comprises a channel impulse response (CIR) waveform generator 21, a multiply-add unit 22, and a weighting coefficient memory 23. The CIR waveform generator 21 converts the received phase reference symbol data from the frequency domain to the time domain, with additional processing that generates a channel impulse response waveform. The multiply-add unit 22 multiplies the waveform data output by the CIR waveform generator 21 by weighting coefficients stored in the weighting coefficient memory 23, and adds the resulting products to obtain the weighted sum.

The CIR waveform generator 21 comprises a phase aligner 101, a phase reference data memory 102, an inverse discrete Fourier transform (IDFT) processor 103, and a power calculation unit 104. The phase reference data memory 102 stores the complex conjugate values of the known data transmitted in the phase reference symbol. The phase aligner 101 multiplies these values by the corresponding values received from the data demodulator 11. The IDFT processor 103 carries out an inverse discrete Fourier transform on the resulting products. The power calculation unit 104 calculates the power of the data values output by the IDFT processor 103 as the sum of the squares of the real and imaginary parts of each data value.

The phase reference data memory 102 and weighting coefficient memory 23 are, for example, storage areas in a read-only memory (ROM). The other elements shown in FIG. 3 comprise arithmetic and logic circuits, descriptions of which will be omitted to avoid obscuring the invention with unnecessary detail.

The timing synchronization processor 20 operates as follows.

If inter-symbol interference and noise are ignored, the value input to the phase aligner 101 for the m-th received carrier is given by the following formula, in which m is a positive or negative integer, j is the square root of minus one, $A_m$ is the carrier amplitude, T is the symbol period, $\theta_m$ is the carrier phase angle (0, $\pi/2$, $\pi$, or $3\pi/2$ radians), and $t_e$ is the timing error. The timing error $t_e$ is the difference between the start of the valid symbol interval and the timing of the first sample in the sampling window.

$$A_m \cdot e^{j\frac{2\pi \cdot m}{T} t_e} \cdot e^{j\theta_m}$$

As known data, the phase reference data memory 102 stores the following value for the m-th carrier:

$$e^{-j\theta_m}$$

This is the complex conjugate of the value that would be received under ideal conditions, with unity amplitude and no timing error. Multiplication of the actual received value by this complex conjugate in the phase aligner 101 has the effect of aligning the phase angles of all the values output from the phase aligner 101 at a phase angle proportional to the timing error $t_e$.

The IDFT processor 103 converts the output of the phase aligner 101 from the frequency domain to the time domain. The output of the IDFT processor 103 represents the impulse response of the channel from the transmitter to the receiver. Under ideal channel conditions, when multipath reception is absent, the output of the IDFT processor 103 is a single complex-valued impulse signal, the impulse occurring at the time, equal to $t_e$, when the phases of all of the carriers are aligned. This time provides a reference point from which the start and end of the valid symbol intervals of the data symbols can be determined. The phase angle of the impulse indicates the phase value at which alignment occurs. The magnitude of the impulse indicates the strength of the received signal, which depends on the transmitter power and channel attenuation.

Under multipath reception conditions, the output of the IDFT processor 103 shows an impulsive peak for each multipath component. In SFN operation, there is at least one peak for each transmitter within receiving range of the receiver.

The power calculation unit 104 converts the complex-valued output of the IDFT processor 103 to non-negative real values, referred to below as CIR data or, collectively, as a CIR waveform. Peaks in the CIR waveform represent the relative strengths and delays of the received signal components.

Figure 4:
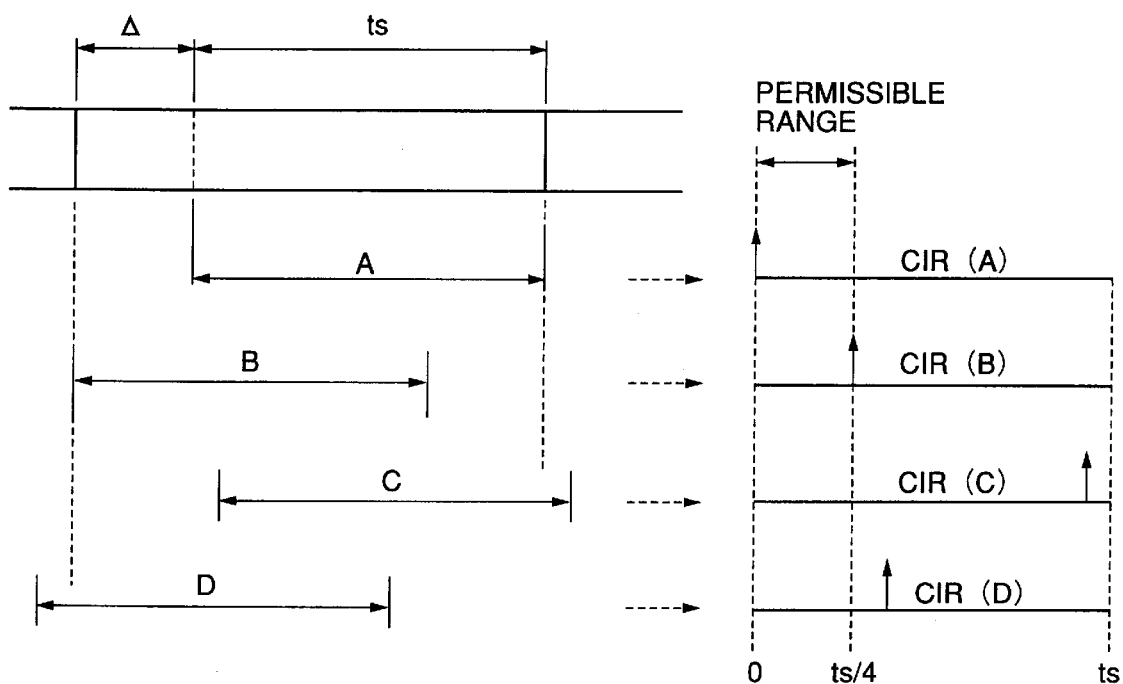
FIG. 4 shows examples of sampling windows and channel impulse response waveforms.

FIG. 4 illustrates the relationship between the timing of the sampling window and the CIR waveform in four cases. In each case there is only one received signal component, and the CIR waveform is shown as an impulse waveform.

When the sampling window is exactly aligned with the valid symbol interval (ts), as illustrated by sampling window A, the impulse occurs at the beginning of the CIR waveform, as illustrated by waveform CIR(A). The timing error ($t_e$) is zero, and there is no inter-symbol interference.

If the sampling window timing is advanced so that sampling begins in the guard interval ($\Delta$), the timing error ($t_e$) is positive, and the impulse is shifted to the right. FIG. 4 illustrates the extreme case of a sampling window B that starts at the beginning of the guard interval ($\Delta$). The impulse in the CIR waveform CIR(B) is delayed by an amount corresponding to the length of the guard interval, which is one-fourth the length of the valid symbol interval (ts/4). As the carrier phase in the guard interval is continuous with the phase in the following valid symbol interval, there is still no inter-symbol interference.

As indicated in FIG. 4, the interval of length ts/4 at the beginning of the CIR waveform is the permissible range of peak locations. Peaks located in the permissible range correspond to signal components that do not produce inter-symbol interference at the present timing of the sampling window.

If the timing of the sampling window is delayed from state A, the data demodulator 11 receives some samples from the guard interval of the next symbol, as illustrated by sampling interval C. The timing error ($t_e$) is now negative, and the impulse occurs near the end of the CIR data, outside the permissible range, at a point corresponding to the end of the valid symbol interval, as illustrated by waveform CIR(C). Inter-symbol interference from the following symbol occurs in this case.

The impulse also occurs outside the permissible range if the timing is advanced from state A by an amount exceeding the length of the guard interval, as illustrated by sampling window D and waveform CIR(D). Inter-symbol interference from the preceding symbol occurs in this case.

When there is only one received signal component, inter-symbol interference can be avoided by adjusting the timing of the sampling window so that the single peak of the CIR waveform occurs at any point in the permissible range from 0 to ts/4 in FIG. 4. When there are multiple signal components and hence multiple peaks, as in multipath reception or reception from an SFN network, inter-symbol interference can be avoided by adjusting the timing of the sampling window so that all peaks fall into the permissible range in the CIR waveform. If the signal components are spread out too much for this to be possible, the sampling-window timing can be optimized by minimizing the total size of the peaks occurring outside the permissible range.

Figure 5:
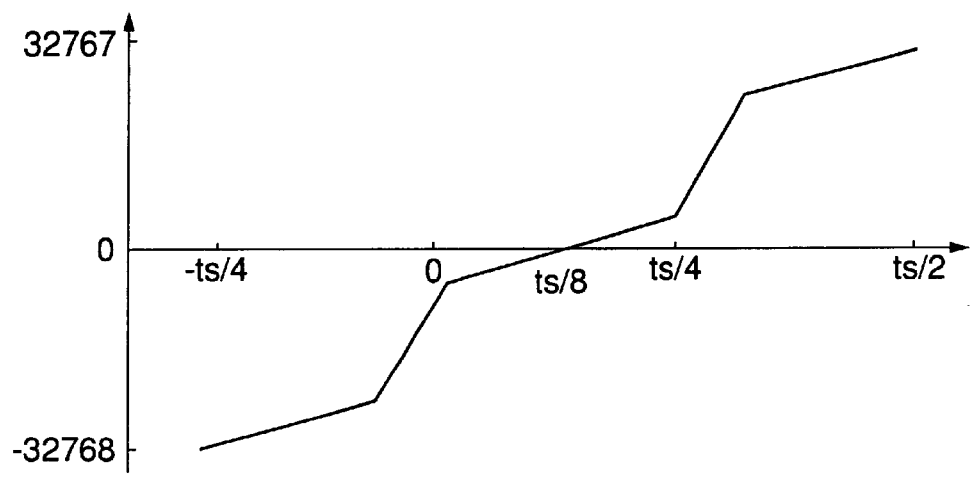
FIG. 5 illustrates a weighting function.

FIG. 5 shows a preferred example of the weighting function stored in the weighting coefficient memory 23. The numerical values of the weighting coefficients are shown on the vertical axis. Only the weighting coefficients for the first half and last one-fourth of the sampling window are shown. The values from 0 to ts/2 on the horizontal axis correspond to the first half of the sampling window. The values from 0 to ts/4 are the permissible range corresponding to the guard interval. The values from –ts/4 to 0 correspond to the last one-fourth of the CIR waveform, –ts/4 corresponding to 3 ts/4.

The weighting function is a piecewise linear function. The weighting coefficient at the midpoint of the permissible range (ts/8) is zero. Weighting coefficients to the right of the midpoint are positive; weighting coefficients to the left of the midpoint are negative. The absolute value of the weighting coefficients increases at a first rate from the midpoint of the permissible range to the edges (0, ts/4) of the permissible range, then increases at a second, steeper rate for a certain interval. After this steep interval, the absolute value of the weighting coefficients continues to increase at the first rate. The weighting function is symmetric with respect to the midpoint of the permissible range.

The control unit 12 adjusts the sampling window timing so as to reduce the weighted sum output by the timing synchronization processor 20 to zero. Specifically, the control unit 12 advances the timing of the sampling window if the weighted sum is negative, and delays the timing if the weighted sum is positive, the amount of the advance or delay depending on the magnitude of the weighted sum.

If the CIR waveform has a single peak, the timing is adjusted so that this peak occurs at substantially the midpoint of the permissible range. The sampling window then starts at the midpoint of the guard interval. If there are several peaks, the control unit 12 adjusts the timing so that the peaks are distributed evenly around the midpoint of the permissible range, with the center of mass of the peaks occurring near the midpoint of the permissible range. For example, if there is one strong peak and several lesser peaks, the strong peak will usually be placed near the midpoint of the permissible range. If there are several strong peaks distributed over an interval not exceeding the length of the guard interval, the control unit 12 adjusts the timing to place all of the strong peaks within the permissible range, to avoid the rapidly increasing weighting coefficients outside the permissible range. In most cases, this timing control scheme places most of the large CIR data values in an interval centered in the middle of the permissible range, thus minimizing inter-symbol interference and leaving a maximum timing margin for the future appearance of new signal components.

Figure 6:
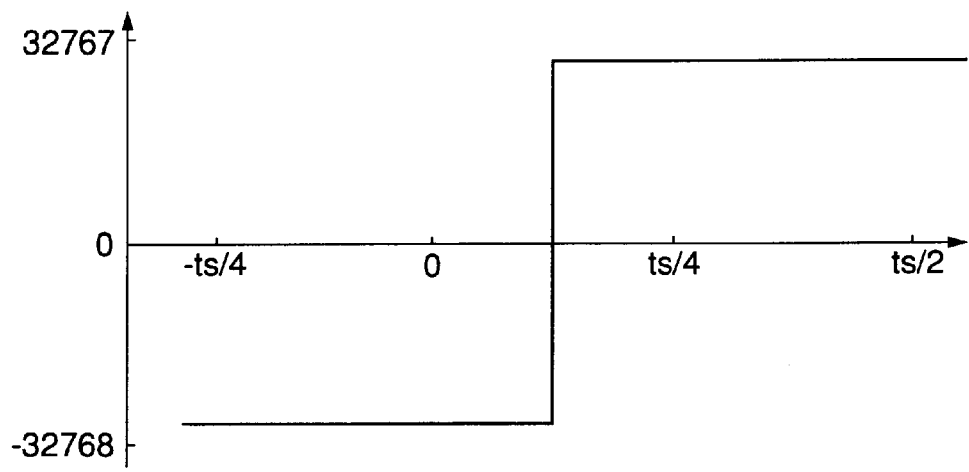
FIG. 6 illustrates another weighting function.

FIG. 6 illustrates a variation of the weighting function in which the weighting coefficient memory 23 stores only one positive and one negative weighting coefficient. The horizontal and vertical axes have the same meaning as in FIG. 5. On the illustrated part of the horizontal axis, CIR data to the right of ts/8 are multiplied by the positive weighting coefficient, while CIR data to the left of ts/8 are multiplied by the negative weighting coefficient. The control unit 12 adjusts the timing so that the CIR data are distributed evenly to the right and left of the midpoint of the permissible range. When the CIR power is concentrated into a comparatively small time interval, the weighting coefficients shown in FIG. 6 provide satisfactory performance, while requiring minimum storage space.

Figure 7:
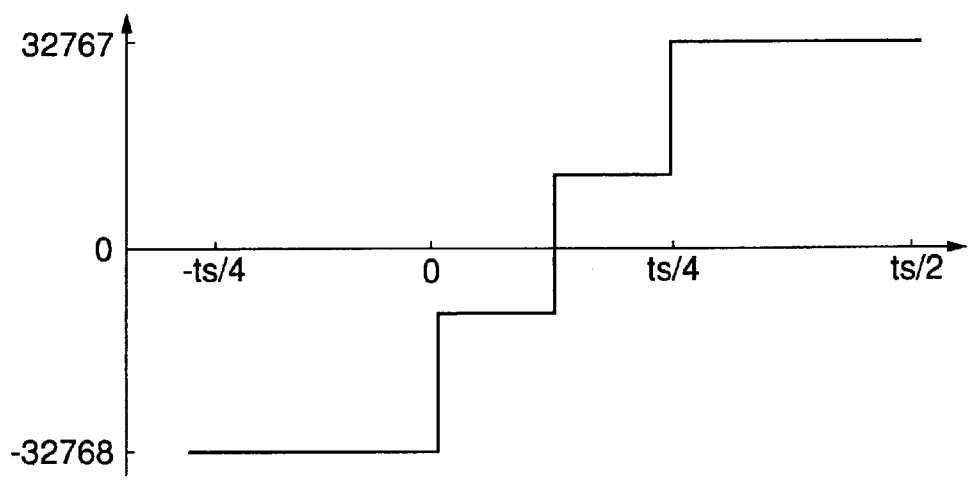
FIG. 7 illustrates another weighting function.

FIG. 7 illustrates another variation, in which the weighting coefficient memory 23 stores two positive weighting coefficients and two negative weighting coefficients. That is, the weighting function is a step function with four steps. The smaller positive and negative weighting coefficients are used inside the permissible range. The larger positive and negative weighting coefficients are used outside the permissible range. Compared with FIG. 6, the weighting function in FIG. 7 provides improved timing control, while still requiring only a small amount of storage space in the weighting coefficient memory 23. If necessary, the number of steps can be increased to obtain an optimum balance between timing control performance and storage requirements.

Figure 8:
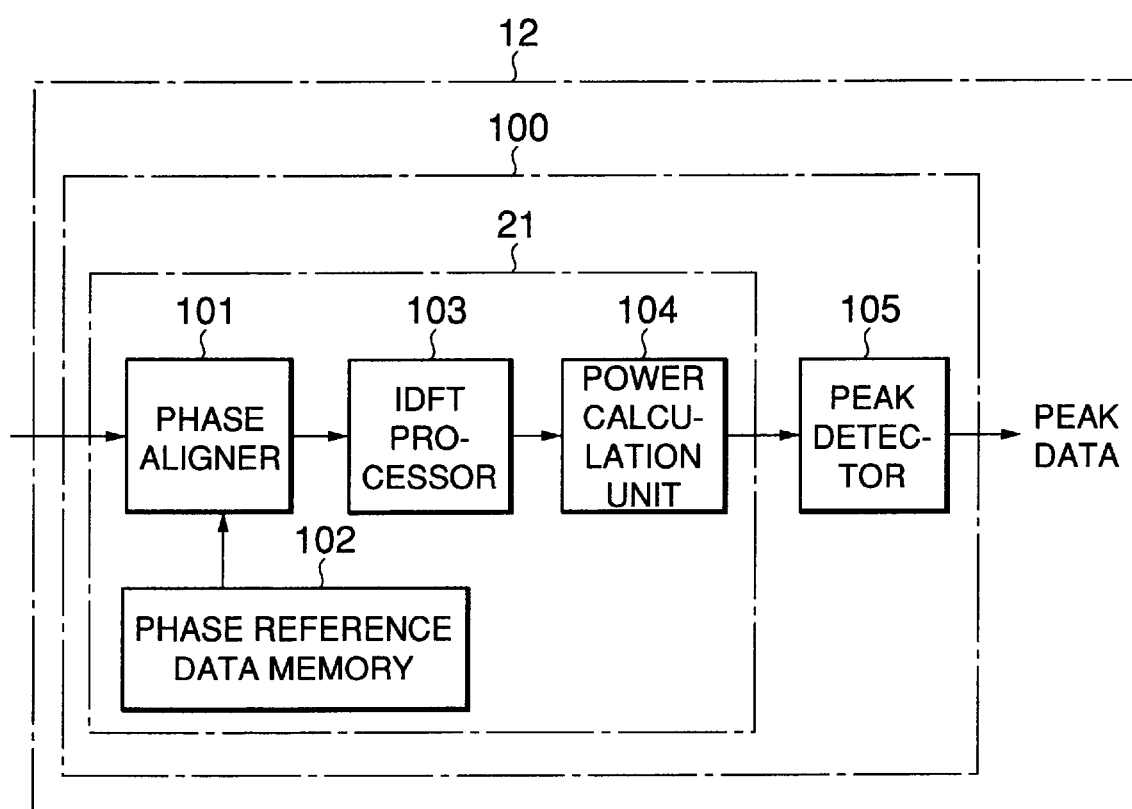
FIG. 8 is a block diagram of the control unit in a conventional digital broadcast receiver.

For comparison with the first embodiment, FIG. 8 shows a control unit 12 having a conventional timing synchronization processor 100 in which the weighting coefficient memory 23 and multiply-add unit 22 of the first embodiment are replaced by a peak detector 105 that detects peaks in the CIR waveform output from the power calculation unit 104, instead of taking a weighted sum of the CIR data. The control unit 12 adjusts the timing of the sampling window according to the values and positions of the detected peaks.

In one conventional control scheme, the control unit 12 finds the largest peak, sets a threshold value in relation to the value of this peak, and adjusts the sampling window so as to move the first peak exceeding the threshold value to the front edge of the permissible range. In a sense, this scheme optimizes the usage of the guard interval; just enough of the guard interval is sampled to position the sampling window within the correct symbol interval in all major signal components, as judged from the threshold value. However, this scheme leaves no timing margin for the sudden appearance of earlier signal components. As a result, during typical reception conditions experienced by mobile receivers, inter-symbol interference occurs frequently, degrading the reproduced signal with audible static.

In another conventional control scheme, the control unit 12 adjusts the sampling window timing so as to leave a predetermined margin between the front edge of the permissible range and the first peak that exceeds the threshold, which is calculated as above. The undesirable result in this case is that if two strongly received signal components are separated by a timing delay exceeding the length of the guard interval minus the predetermined margin, a situation which is quite possible in SFN operation, the peak corresponding to the more delayed component is forced out of the permissible range, again causing inter-symbol interference and audible static.

As described above, the first embodiment solves these problems by distributing the peaks around the midpoint of the permissible range. Under typical conditions, a timing margin for the appearance of new peaks is left at both edges of the permissible range. If there are two strong, widely separated peaks, they are both placed in the permissible range, the timing margins at the edges being reduced to accommodate them.

Next, a second embodiment will be described. The second embodiment has the same overall configuration as the first embodiment, shown in FIG. 2. The control unit 12 in the second embodiment, however, is a computing device, such as a microprocessor, that uses software to carry out the calculations described in the first embodiment. The control unit 12 in the second embodiment also uses the CIR waveform data to control the frequency of the VCXO 8.

Figure 9:
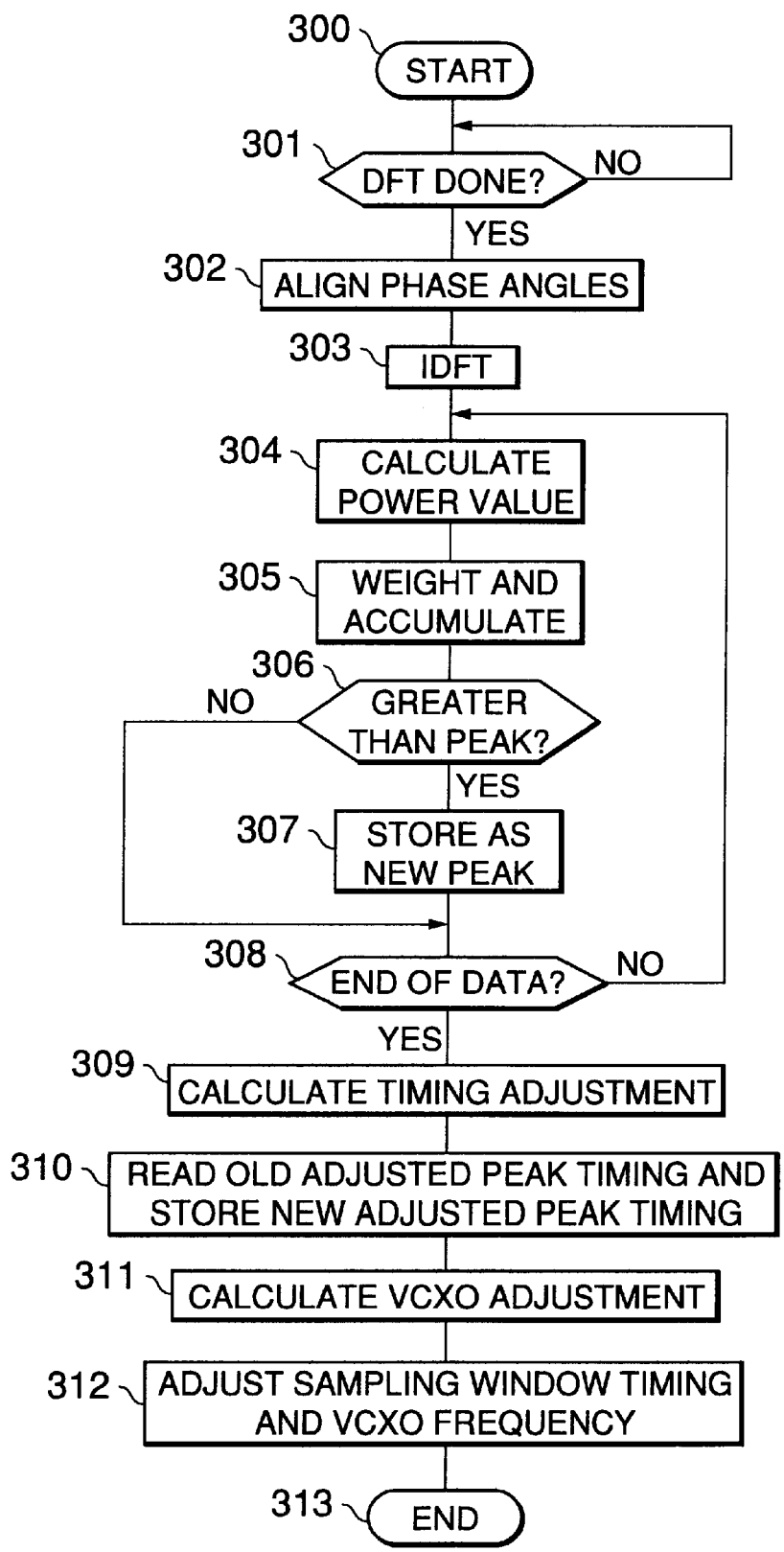
FIG. 9 is a flowchart illustrating the operation of a timing adjustment routine in a second embodiment of the invention.

The control program executed by the control unit 12 in the second embodiment includes a timing adjustment routine that operates as shown in FIG. 9. This routine is called (step 300) after the control unit 12 has already completed coarse timing adjustment by use of the null-symbol timing information supplied by the synchronization signal detector 10.

When called, the timing adjustment routine waits for the data demodulator 11 to complete the discrete Fourier transform of the phase reference symbol (step 301). The received phase reference data values are then multiplied by the complex conjugates of their known values to align their phase angles (step 302), and an inverse discrete Fourier transform is carried out on the aligned data (step 303) as described in the first embodiment.

The resulting time-domain data are processed in the loop from step 304 to step 308. The squares of the real and imaginary parts of one data value are added to obtain a power value (step 304), which is multiplied by a weighting coefficient and added to a cumulative sum of weighted power values obtained from the same phase reference symbol (step 305). The power value is also compared with the peak power value obtained from this phase reference symbol so far (step 306). If the power value exceeds the peak value, the power value is stored as a new peak value, and its timing position is stored as a new peak timing (step 307). This loop is repeated until the end of the data obtained from the current phase reference symbol is reached (step 308).

The control unit 12 now calculates the required adjustment $D_T$ of the timing of the sampling window according to the cumulative sum of weighted power values (step 309), as described in the first embodiment. Next, the control unit 12 adds the value of the calculated timing adjustment $D_T$ to the peak timing detected in the loop from step 304 to step 308 to obtain a new adjusted peak timing. The control unit 12 then reads an old adjusted peak timing, which was calculated and stored during the similar processing of the preceding phase reference symbol, and stores the new adjusted peak timing in place of the old adjusted peak timing (step 310).

Next, the control unit 12 calculates the difference between the old adjusted peak timing read in step 310 and the new, unadjusted peak timing found in the loop from step 304 to step 308. If the transmission channel characteristics are reasonably stable and the VCXO 8 is operating at the correct frequency, this difference should be zero. If this difference is not zero, then barring the abrupt appearance of a new strongest signal component, the probable reason is that the VCXO frequency is incorrect. From the value of the difference, the control unit 12 calculates the amount $D_{VCXO}$ by which the control signal supplied to the VCXO 8 needs to be adjusted (step 311).

Finally (step 312), the control unit 12 adjusts the timing of the sampling window by the value DT calculated in step 309, and adjusts the frequency of the VCXO 8 by adding the amount $D_{VCXO}$ calculated in step 311 to the value of the VCXO control signal. The routine then ends (step 313).

With regard to the sampling window timing, the second embodiment provides the same effect as the first embodiment. Regarding adjustment of the VCXO frequency, by calculating this adjustment from the position of the highest peak in the CIR waveform, the second embodiment is able to maintain stable frequency control, even when changing channel conditions produce considerable changes in the power level and shape of the CIR waveform. This is because, even when the relative heights of the peaks in the CIR waveform change, the strongest peak tends to remain associated with the same signal component.

The conventional receiver described in FIG. 8 also controlled the VCXO frequency according to the CIR data, but did so in a different way. Specifically, the sampling window timing was adjusted as described in connection with FIG. 8 in units equal to the interval between CIR data points, that is, to the sampling period of the analog-to-digital converter 9, and the VCXO frequency was adjusted to correct residual timing errors. Accordingly, the sampling window timing and VCXO frequency were adjusted on the basis of the same selected peak position. Under typical mobile receiving conditions, in which peaks readily appear, disappear, and vary in relative size, the selected peak tended to change frequently. As different peaks were selected for use in the sampling window timing adjustment, the residual timing error would vary in a manner independent of the actual VCXO frequency error. When this happened, the VCXO frequency failed to converge to a value appropriate for the transmitter's symbol rate, and might oscillate by amounts large enough to lead to inter-symbol interference.

As described above, by determining the sampling window timing from a weighted sum of all the CIR power values, the present invention is able to maintain substantially optimal positioning of the sampling window under diverse reception conditions, including multipath and SFN conditions.

A weighting function with weights that increase steeply near the edges of the permissible range in the CIR waveform is particularly effective in this regard.

When a step function is used as a weighting function, these effects are achieved without the need to store large amounts of weighting-coefficient data. Step functions that assign comparatively large weights outside the permissible range in the CIR waveform are particularly effective.

By adjusting the VCXO frequency according to the position of the highest peak in the CIR data, the present invention maintains stable frequency control despite changing channel conditions.

Instead of storing weighting coefficients, the control unit 12 may calculate the weighting coefficients as they are required. Weighting coefficients can be calculated rapidly by adding increments to an initial value according to a rule such as the one illustrated in FIG. 10. The CIR waveform is divided into five sections, and the weighting coefficient is incremented by a constant amount in each section. For DAB Transmission Mode One, for example, in which the CIR data comprise one thousand five hundred thirty-six (1536) data points per symbol, three of the sections have lengths of four hundred forty-eight (448) data points, and the other two sections have lengths of ninety-six (96) data points. An initial value of −32768 is assigned to the first data point in the first section, corresponding to time 5 ts/8 in the sampling window, or to −3 ts/8 on the horizontal axis in FIG. 5. The weighting coefficient K is incremented by twenty-four ($\Delta K=24$) at each successive data point for the next four hundred forty-eight (448) data points, then by one hundred seventy-three ($\Delta K=173$) per data point for each of the next ninety-six (96) data points, and so on as indicated, wrapping around from the last data point in the sampling window to the first data point. The last weighting coefficient produced in this way has a value of +32704. The resulting weighting function is a piecewise linear function generally similar to the one in FIG. 5.

The weighting coefficients can also be normalized to real numbers with absolute values of one or less, by dividing the calculated values by the largest absolute value (32768).

Those skilled in the art will recognize that further variations in the embodiments described above are possible within the scope claimed below.

What is claimed is:

1. A digital broadcast receiver for receiving a multi-carrier signal that periodically includes a synchronization signal, having a data demodulator that demodulates the multi-carrier signal by use of a sampling window to obtain demodulated data, and a control unit that controls the timing of the sampling window, the control unit comprising:

a waveform generator generating a channel impulse response waveform from the demodulated data of the synchronization signal; and a multiply-add unit coupled to said waveform generator, multiplying values in the channel impulse response waveform by corresponding weighting coefficients in a predetermined weighting function, thereby obtaining product values, and adding the product values to obtain a weighted sum;

wherein the control unit adjusts the timing of the sampling window according to said weighted sum.

2. The digital broadcast receiver according to claim 1, further comprising:

an analog-to-digital converter sampling said multi-carrier signal and providing digitized sample values to said data demodulator; and a voltage-controlled oscillator determining a sampling frequency of said analog-to-digital converter;

wherein the control unit detects a timing of a maximum peak value in the channel impulse response waveform, adjusts the timing of said maximum peak value to compensate for an amount by which the timing of the sampling window is adjusted, thereby obtains an adjusted peak timing, calculates a difference between the timing of the maximum peak value detected for one synchronization signal and the adjusted peak timing obtained for a preceding synchronization signal, and adjusts a frequency of the voltage-controlled oscillator according to said difference.

3. The digital broadcast receiver according to claim 1, wherein the multi-carrier signal is divided into symbol intervals, each having a guard interval, the channel impulse response waveform has a permissible range corresponding to the guard interval, and the weighting function is symmetric with respect to a midpoint of the permissible range, with positive values on one side of said midpoint and negative values on another side of said midpoint.

4. The digital broadcast receiver according to claim 3, wherein the weighting coefficients of the weighting function have larger absolute values outside the permissible range than inside the permissible range.

5. The digital broadcast receiver according to claim 4, wherein the absolute values of the weighting coefficients increase at a first rate from the midpoint of the permissible range toward both edges of the permissible range, and increase at a second rate, greater than the first rate, in a certain area beyond both edges of the permissible range.

6. A method of controlling sampling timing in a digital broadcast receiver receiving a multi-carrier signal, according to a channel impulse response waveform obtained by demodulating a synchronization signal broadcast periodically in the multi-carrier signal and processing demodulated synchronization data thus obtained, comprising the steps of:

(a) multiplying values in the channel impulse response waveform by corresponding weighting coefficients in a predetermined weighting function, thereby obtaining product values;

(b) adding said product values to obtain a weighted sum; and (c) adjusting a sampling window according to said weighted sum, the sampling window being used in demodulation of the multi-carrier signal.

7. The method according to claim 6, further comprising the steps of:

(d) detecting a timing of a maximum peak value in the channel impulse response waveform;

(e) adjusting the timing of said maximum peak value to compensate for an amount by which the sampling window is adjusted in said step (c), thereby obtaining an adjusted peak timing;

(f) calculating a difference between the timing detected in said step (d) for one synchronization signal and the adjusted peak timing obtained in said step (e) for a preceding synchronization signal; and (g) adjusting a sampling frequency of said multi-carrier signal according to the difference calculated in said step (f).

8. The method according to claim 6, wherein the multi-carrier signal is divided into symbol intervals, each having a guard interval, the channel impulse response waveform has a permissible range corresponding to the guard interval, the weighting function is symmetric with respect to a midpoint of the permissible range, with positive values on one side of said midpoint and negative values on another side of said midpoint, and the weighting coefficients of the weighting function have larger absolute values outside the permissible range than inside the permissible range.

9. The method according to claim 8, wherein the absolute values of the weighting coefficients increase at a first rate from the midpoint of the permissible range toward both edges of the permissible range, and increase at a second rate, greater than the first rate, in a certain area beyond both edges of the permissible range.

10. The method according to claim 6, further comprising the steps of:

(h) dividing the channel impulse response waveform into a plurality of sections;

(i) assigning an initial weighting coefficient at a beginning of one of said sections; and (j) generating the weighting coefficients by adding predetermined increments to said initial value, the predetermined increments being constant in each of said sections.

* * * * *